Figure 1:
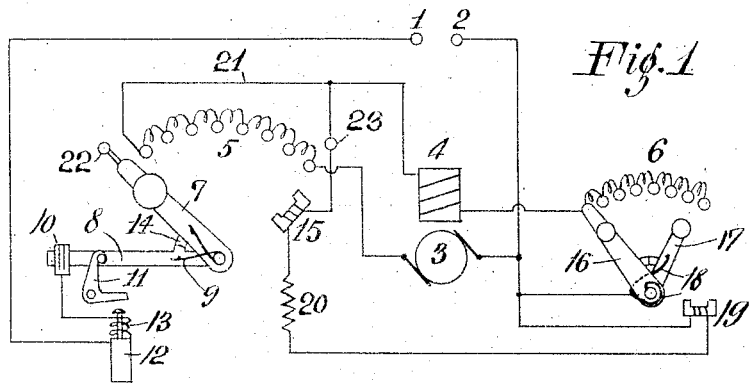

H. W. LEONARD.
ELECTRIC MOTOR CONTROLLING APPARATUS.
APPLICATION FILED JAN. 23, 1905. RENEWED FEB. 20, 1907.

978,173.

Patented Dec. 13, 1910.
5 SHEETS—SHEET 1.

Witnesses
L. K. Sager.
Geo. K. Kerr.

H. Ward Leonard, Inventor
By his Attorney
C. W. Edwards

H. W. LEONARD.
ELECTRIC MOTOR CONTROLLING APPARATUS.
APPLICATION FILED JAN. 23, 1905. RENEWED FEB. 20, 1907.

978,173.

Patented Dec. 13, 1910.

5 SHEETS—SHEET 4.

Witnesses
L. K. Sager
Geo. U. Kerr.

H. Ward Leonard, Inventor
By his Attorney
C. W. Edwards

UNITED STATES PATENT OFFICE.

HARRY WARD LEONARD, OF BRONXVILLE, NEW YORK.

ELECTRIC-MOTOR-CONTROLLING APPARATUS.

978,173. Specification of Letters Patent. Patented Dec. 13, 1910.

Application filed January 23, 1905, Serial No. 242,203. Renewed February 20, 1907. Serial No. 358,417.

*To all whom it may concern:*

Be it known that I, HARRY WARD LEONARD, a citizen of the United States, residing at Bronxville, in the county of Westchester and State of New York, have invented certain new and useful Improvements in Electric-Motor-Controlling Apparatus, of which the following is a full, clear, and exact specification.

This invention relates to electric motors, and particularly to the provision of means which will insure the proper operation of controlling devices therefor.

By my invention I provide controlling means for each element of the motor and the controlling means of one element are functionally related to those of the other so that they are necessarily operated in a proper manner. I therefore protect the motor and other portions of its circuit from the objectionable or injurious effects due to improperly starting up or operating a motor when the strength of its field is less than a desirable amount. I also provide suitable protective devices which will respond to protect the motor under abnormal conditions, all of which coöperate to secure freedom to the motor from any harmful effects.

In another pending application, I have shown various means for carrying out the essential object of this invention, which are based upon a functional mechanical relation between the motor starter and field rheostat. In the present case the functional relation between the motor starter and field rheostat is electrical and is dependent upon the electrical condition of certain circuits.

My invention may be embodied in various arrangements and forms of construction, some of which are shown in the accompanying drawings, and the form illustrated in each figure comprises my invention and represents one specific embodiment thereof.

Figures 1 to 13 of the drawings are diagrammatic views illustrating preferred forms of my invention, each showing a modification different from that shown in the other views.

Similar parts are indicated by the same reference character in each of the figures.

Referring to Fig. 1, the supply terminals of a constant electromotive force circuit are indicated at 1, 2, the motor armature at 3, and the motor field at 4. A starting resistance 5 is shown connected in the armature circuit and a resistance for varying the field strength is indicated at 6. The starting rheostat is in this instance provided with two arms 7, 8 pressed toward each other by a spring 9. The arm 8 serves as a main overload switch and normally engages a fixed contact 10, being retained in position by a catch 11. The latter is adapted to be thrown by the upward movement of core 12 when an abnormal current flows through its coil 13. The coil 13 is connected in the main circuit from 1 to contact 10. The arm 7 is shown in the off position and in this position closes the switch or arm 8 as, for example, by engagement of an abutment 14. A no-voltage or low voltage magnet 15 is provided for holding the arm 7 when all starting resistance is cut out. The controlling arm 16 of the field rheostat is not spring pressed, but there is provided an arm 17 and spring 18, which spring tends to force arm 17 against the arm 16 and throw the latter to such a position that all field resistance is cut out. A retaining magnet 19 is provided for the arm 17 and its coil is connected in series with coil 15 and a resistance 20 across the line.

When the current supply is interrupted, or a very low voltage occurs, the magnets 15 and 19 are deënergized, or their strength reduced, the arm 7 returning to the off position by pressure of spring 9 and the arm 17 is forced against the arm 16, returning it to such a position that all the field resistance is cut out as shown. Hence upon starting, the field will always have its full strength, and the objectionable effects of starting under a weak field are avoided. In starting, the arm 7 is moved to the first contact of the starting resistance and the circuit through the armature and resistance 5 from the supply mains is completed. The motor field is then fully excited, current passing from 1, through the overload coil 13, arms 8 and 7, conductor 21, field 4, arm 16 to terminal 2. Current also passes independently across the line through coil 15, resistance 20, and coil 19. As arm 7 is moved, the starting resistance is cut out and when the arm reaches its final position, it will be held by the magnet 15. The arm 7 may in some cases be provided with an auxiliary contact 22 which engages the contact 23 at the final position. This will connect the field directly across the line and the magnet coils 15 and 19 will likewise be connected directly across the line. When it is desired to weaken the field of the motor, the arm 17 is moved to engage the retaining magnet 19. The field rheostat arm is then free to be moved to vary the field resistance and therefore the speed of the motor. If an abnormally large current or overload is taken by the motor, the core 12 will be raised and knock the latch 11 to release arm 8, breaking the main circuit at the contact 10. This will deënergize the magnets 15 and 19, and cause the field rheostat arm 16 to be forced to its initial position cutting out the field resistance and insuring a full field strength upon starting. Before again starting, it is necessary to move the switch 8 to its closed position by means of arm 7 thus insuring the closing of switch 8 before the circuit is closed by the starting arm 7.

Figure 2:
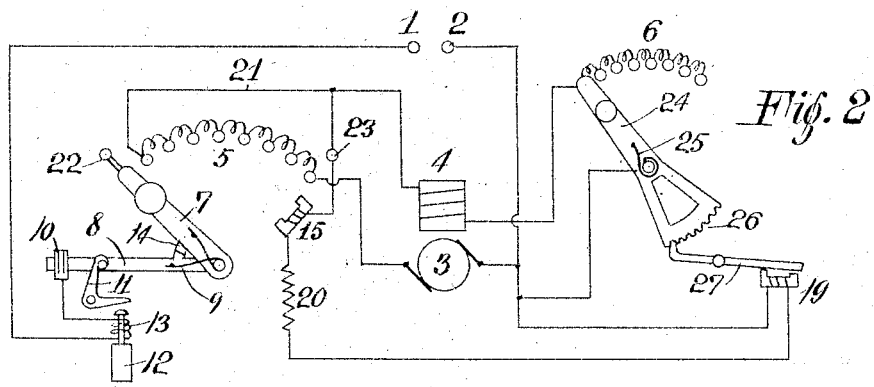

In Fig. 2 a construction is disclosed which is in general similar to that of Fig. 1. The controlling arm 24 of the field rheostat is spring pressed however, as by spring 25. The arm has a toothed sector 26, the teeth of which are engaged by a pivoted lever 27, the action of gravity tending to keep the lever and teeth in contact. The retaining magnet 19, when energized tends to force one end of lever 27 into engagement with the teeth and with a sufficient amount of force to overcome the pressure of the spring 25, thus holding the arm in any position desired. When, however, the magnet is deënergized, the spring 25 will return the arm to the position shown, the teeth slipping by the end of lever 27. The field resistance is thus cut out and starting under full field strength is insured. After starting, the arm 24 may be operated manually, overcoming the spring pressure and the force of holding lever 27.

Figure 3:
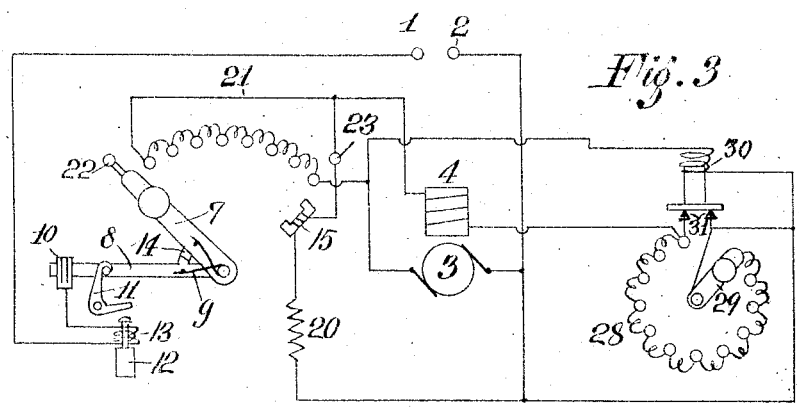

Fig. 3 shows a construction in which a similar starting rheostat and overload device may be used. In this case the field rheostat 28 is controlled by an arm 29 which is freely movable. A coil 30 is connected across the terminals of the armature 3 and its core carries a switch adapted to close connection between the two contacts 31 and in doing so, short circuits any of the field resistance 28 which may happen to be cut in. When sufficient current passes in coil 30, the core will be raised and such portion of resistance 28 will be cut in the field circuit as is determined by the position of arm 29. When the motor is started, the core of coil 30 will connect the terminals 31 giving the field its full strength. As the motor speeds up, its counter electromotive force increases and when it reaches a predetermined amount, the coil 30 will raise its core and then permit any desired variation in the field strength. In case too much resistance is inserted at the time the short circuit is removed, an abnormal armature current flows and opens the overload circuit breaker. This would indicate to the operator that the excessive resistance in the field circuit must be removed before starting again.

Figure 4:
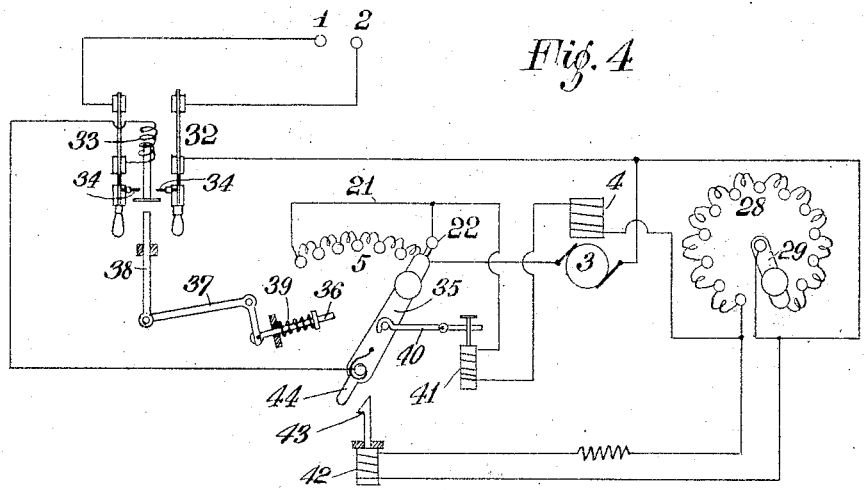

In Fig. 4 another modification is shown. The mains from the supply terminals 1, 2 pass to the double pole circuit breaker 32, one line including the overload coil 33. The core of the latter trips the latches indicated at 34 upon its upward movement, due to overload, whereupon the spring pressed switches are forced outward and open the main circuit. The arm 35 of the starting rheostat is spring pressed, tending to return it to the starting position. This arm does not open the circuit at the rheostat, but at its initial position strikes the rod 36 which will open the circuit breaker 32 by raising the core of coil 33 by means of the lever 37 and rod 38. The rod 36 is normally forced into the path of arm 35 either by a spring as 39 or through gravity. The arm 35 is held in its final position by a latch 40. This may be tripped by the fall of a core 41 which is held up during operation by its coil which is shown in series with the field 4. This coil therefore acts as a no-voltage release.

In order to prevent improper starting, I provide a locking device for the arm 35. This is shown as a solenoid 42, the plunger of which carries a catch 43 having one of its faces inclined. The coil of the solenoid may have a resistance in series with it and is connected between the arm 29 of the field rheostat 28 and the initial contact of the rheostat. The excitation of coil 42 will, consequently, depend upon the drop in volts upon the field resistance which is dependent upon the position of arm 29. When the drop in volts is a predetermined amount, the core of solenoid 42 is raised and the catch 43 projects into the path of an extension 44 on arm 35 permitting the extension to ride over the inclined face in one direction, but afterward locking the arm from movement in the opposite direction.

Upon opening the main circuit or upon the occurrence of no-voltage, the arm 35 will be released by the action of core 41 and its spring will force the arm to its initial position and the blow on rod 36 will open the circuit breaker 32 as above explained. There is sufficient lost motion of the parts so that the core of coil 33 is not raised by rod 38 when the arm 35 is at rest in its initial position on the first contact. If, upon again starting, an excessive resistance is in the field, the closing of the main circuit will cause the catch 43 to be raised and prevent the arm 35 from cutting out the armature resistance until the operator has first cut out the field resistance when the catch 43 will fall. This figure shows running conditions and with all the field resistance cut in.

Figure 5:
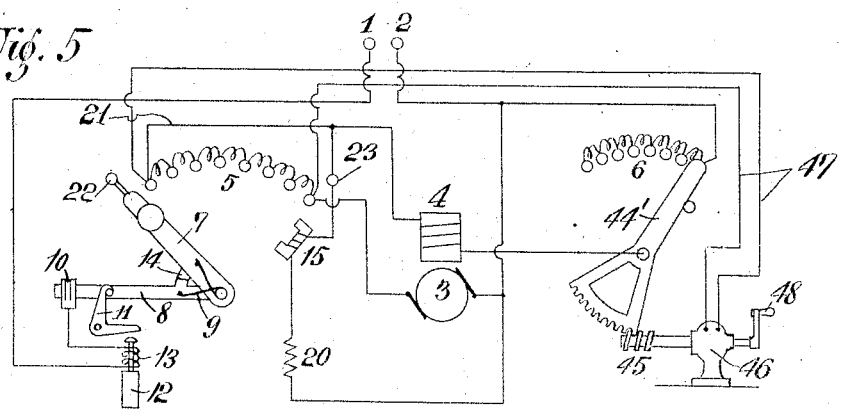

In Fig. 5 a construction is indicated in which the starting rheostat and overload and no-voltage devices are similar to those shown in Figs. 1 and 3. The controlling arm 44' of the field rheostat is however, provided with a toothed rack engaged by a worm 45 on the shaft of a small motor 46. This motor is connected by wires 47 to the outside contacts of the armature resistance 5, or if desired to intermediate contacts thereon. The motor 46 is therefore subjected to the drop in volts which occurs on the starting resistance and when driven, turns in a direction so as to cut out any field resistance which may happen to be in circuit. When the arm 7 is moved to the first contact in the starting, the motor 46 is subjected to the drop occurring between the terminals of wires 47 and the motor 46 will be driven so as to move the field rheostat arm to the position shown, giving the field its full strength. The resistance 5 will thereafter be cut out only under condition of a full field. When all of the armature resistance is cut out, the motor 46 will have no further tendency to turn. The strength of the field 4 may afterward be varied by manually cutting in or out portions of the resistance 6, as by turning the handle 48 on the shaft of motor 46.

Figure 6:
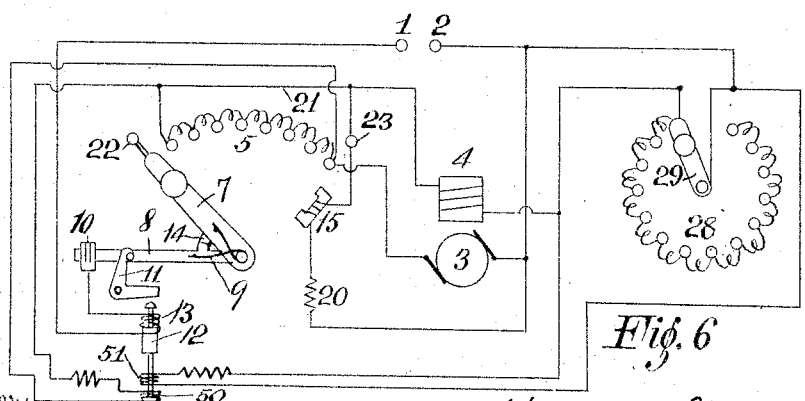

In Fig. 6 the starting rheostat is similar to that of Fig. 3 and the field resistance 28 is controlled by the freely movable arm 29. The plunger 12 of the overload device is provided in this case with an additional core 49 on which two coils, 50 and 51, tend to act. Coil 50 is connected around the resistance 5, or if desired may include only a portion thereof. Coil 51 is connected from the initial contact of the field resistance to the arm 29. Coil 50 will therefore be subjected to the drop in volts which occurs upon the starting resistance and coil 51 to that which occurs upon the field resistance. When current passes in only one of these coils, it is insufficient to raise the plunger, but when the current passing in one is aided by a current passing in the other, the plunger will be raised and trip the latch 11, which will cause the main circuit to be opened. If upon closing the main circuit in starting by means of arm 7, any appreciable amount of field resistance is cut in, the current in the two coils 50 and 51 will co-act to raise the plunger and the arm 8 will be thrown to open the circuit. Before starting again, the operator will move arm 29 to cut out the field resistance and the motor will then be started under full field strength. After the starting resistance is cut out and the motor is up to speed, the arm 29 may be manipulated to vary the field resistance as desired. Increasing the field resistance will not then trip the latch 11, although a current will flow in coil 51, since there will then be no current in coil 50.

Figure 7:
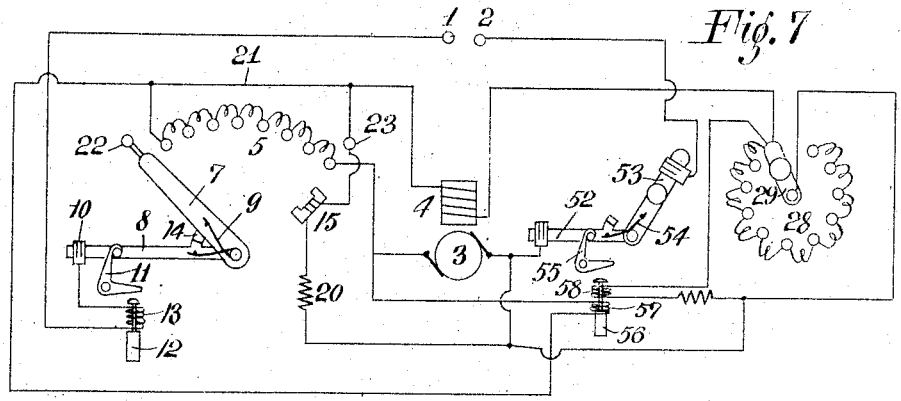

In Fig. 7 I also illustrate a starting rheostat and overload device of the form shown in Fig. 3. In this case I show an auxiliary switch in the main circuit comprising two pivoted arms 52, 53 pressed toward each other by a spring 54. The arm 53 is manually operated and engages a contact which holds it in position by friction. The arm 52 is forced to engage its contact by movement of arm 53 against an abutment on arm 52. A latch 55 will hold the arm 52 in engagement with its contact and is adapted to be tripped by the upward movement of the plunger 56. When current flows in either coil 57 or 58 the plunger will not be raised, but when the current flows in both of the coils they act accumulatively and raise the plunger to trip latch 55, permitting the arm 52 to be opened. The coil 57 is connected across the armature resistance 5 and the coil 58 is connected so as to be subjected to the volts dropped on the field resistance. Hence upon starting, this switch will be opened unless the field resistance is cut out and it will be necessary to move the arm 29 to the initial contact before the motor can be speeded up.

Figure 8:
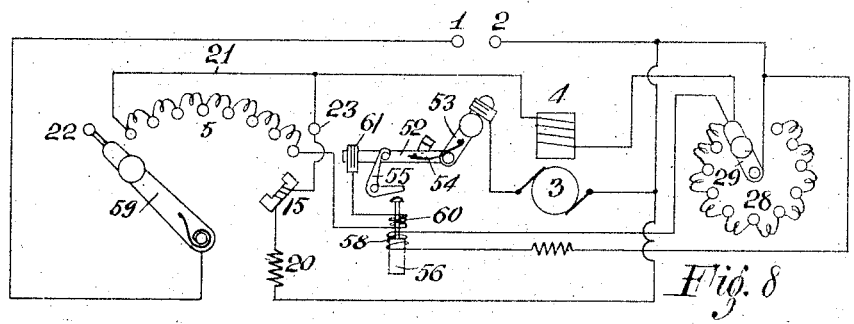

In Fig. 8 I have shown the starting rheostat as provided with a spring pressed arm 59 adapted to be held in its final position by the no-voltage magnet 15. In the main circuit is inserted the switch having the two pivoted arms 52, 53 pressed toward each other by the spring 54 and having the latch 55 as explained with reference to Fig. 7. The plunger 56 is provided with a coil 58 connected as in Fig. 7 to the field rheostat and the coil 60 is connected in the main circuit between the rsistance 5 and the contact 61. The coil 60 will therefore act as an overload coil and trip the latch 55 upon the occurrence of an abnormal current. When starting, the arm 52 is made to engage contact 61 by means of arm 53 and then arm 53 is moved to engage its contact. The main circuit is closed by moving the arm 59 to the initial contact and if an undesirable amount of resistance is in the field circuit, the current which will flow in coil 58 will act with the current in coil 60 to raise the plunger and open the main circuit. Before again attempting to start, the field resistance must be cut. With this arrangement it is impossible to take under running conditions, as large a current when the field is weak as may be taken when the field is strong. This is desirable on account of the objectionable sparking which is likely to occur when a large load is carried on a weak field.

Figure 9:
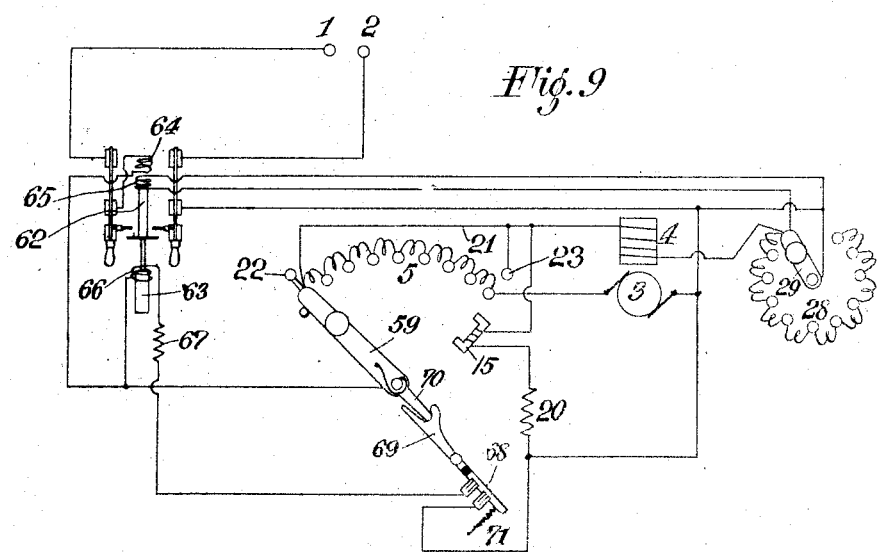

In Fig. 9 I show a double pole circuit breaker and the spring pressed arm 59 of the starting rheostat has no open position. The plunger of the circuit breaker is provided with two cores 62, 63, preferably rigidly connected. The core 62 is provided with two coils 64, 65, the coil 64 being connected in the main circuit and the coil 65 to the initial contact of the field rheostat and to the arm 29. The coils act accumulatively to raise the core 62. The coil 66 acts to raise the core 63 and is connected across the line through a resistance 67 and a switch 68. The blade of the latter is carried by a pivoted lever 69 which is engaged by an extension 70 on the arm 59. When the arm 59 is moved from its initial position it opens the switch 68 against the pressure of a spring 71. When the switch 68 is closed, the current passing in coil 66 will be sufficient to raise the plunger and open the circuit breaker. This coil will therefore protect the armature resistance and other parts of the circuit against damage which might result from leaving arm 59 in the initial position for an unusual time. This condition might arise upon failure of current for a brief interval, causing the arm to return to its initial position and then subjecting the resistance to the current when restored. The same condition might arise if the circuit of magnet 15 alone were accidentally interrupted. The opening of the circuit breaker by coil 66 therefore avoids such a condition. When an abnormal current passes in coil 64 the circuit breaker will be opened in the usual manner. If in starting, there is resistance in the field, the current in coil 65 will coöperate with that in 64 and open the circuit breaker and necessitate cutting out the field resistance. In this arrangement, as in Fig. 8, a less overload current is permissible when the field is weak than when the field is strong. In starting, the field rheostat should be moved to short circuit position and the arm 59 should then be moved slightly until the switch 68 is opened, then while holding the arm 59, the two arms of the double pole circuit breaker should be closed successively.

Figure 10:
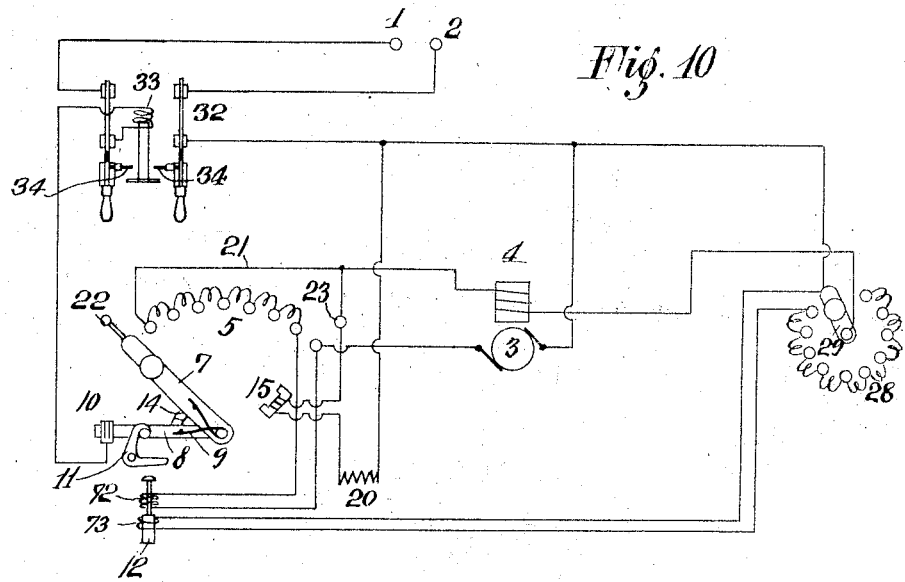

In Fig. 10 I provide the starting rheostat having the two spring pressed arms 7, 8, with the latch 11 for the arm 8 and the no-voltage magnet 15 for arm 7. An overload double pole circuit breaker 32 is connected in the main circuit. In this case the plunger 12 for tripping the latch 11, is provided with two coils 72, 73 which act accumulatively. The coil 72 is connected in series with the starting resistance 5 between the last two contacts in place of a resistance step. The coil 73 is connected in series with the field resistance 28 and between the first two contacts in place of a resistance step. The starting current passing through coil 72 is not sufficient to raise the plunger 12 but when assisted by the field current will be raised and the arm 8 released. In starting, the arm 7 is moved to off position shown in the drawing, closing arm 8 and the two sides of the circuit breaker 32 are then closed successively. The arm 7 is then moved to the first contact of the starting resistance. If any resistance is in the field circuit, the latch 11 will be tripped, since the plunger 12 is acted upon by both the field and the armature current in coils 72, 73. The arm 29 must therefore be returned to the initial contact of the field rheostat before the motor can be started. When the starting arm 7 is moved to the final contact after properly starting, the coil 72 will be cut out of circuit and the field rheostat may be varied as desired, the current in coil 73 alone not being sufficient to raise the plunger. The circuit breaker 32 may be set to higher amperes than the coil 72, permitting large motors to be started on friction or light loads by means of a small starter and the motor may afterward be heavily loaded and varied in speed by means of the field rheostat. This arrangement will be desirable for very large motors which receive heavy overloads after being started.

Figure 11:
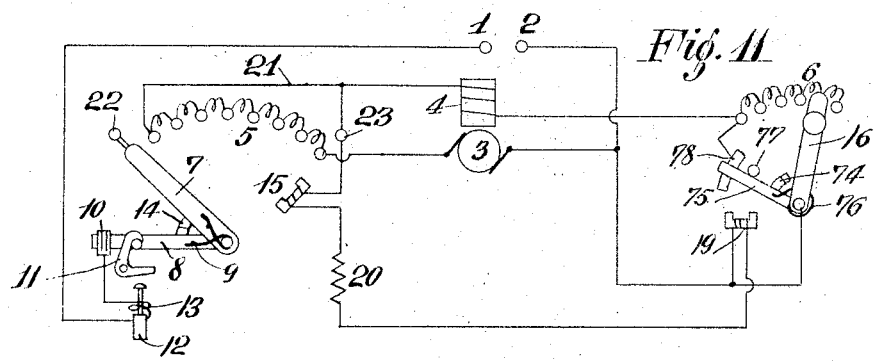

In Fig. 11, I have shown a starting rheostat and overload device of the form shown in Fig. 1. An arm 16 is freely movable over the field resistance 6 and is adapted to engage an abutment 74 on arm 75 to force the same against the pressure of spring 76 to engage the no-voltage or low voltage magnet 19. The latter is connected in series with the no-voltage magnet 15 and resistance 20 across the line as in Fig. 1. Upon the occurrence of a low voltage, the spring 76 will throw the arm 75 against a stop 77. In this position the arm 75 engages a contact 78 in electrical connection with the initial contact of the field resistance, and forms a direct path for the field current from the field coil through arm 75 to terminal 2. Any field resistance cut in by arm 16 will therefore be short circuited by arm 75 and starting under a full field is therefore insured. After starting, the arm 16 may be moved to remove the short circuiting arm 75 and force the same against the magnet 19, where it will be held and arm 16 may then be moved to vary the resistance in the field circuit.

Figure 12:
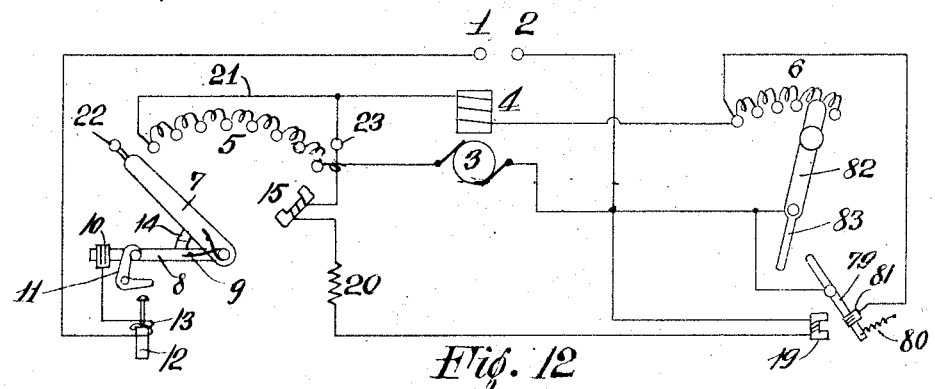

In Fig. 12 the magnet 19 will hold one end of the pivoted lever 79 against the pressure of spring 80 under running conditions. When released by the magnet, the lever will engage a contact 81 which is in electrical connection with the initial contact of the field resistance. The lever is in electrical connection with the terminal 2. The engagement of the lever with contact 81 will therefore short circuit the field resistance, there being a direct connection from the field coil to contact 81, through lever 79 to terminal 2. Starting will therefore necessarily occur under full field strength. After starting, the arm 82 must be moved to the initial contact and by means of the extension 83, throw the lever 79 out of engagement with contact 81 and into position to be retained by magnet 19. This will remove the short circuit of the resistance 6 and the field strength may then be changed as desired.

Figure 13:
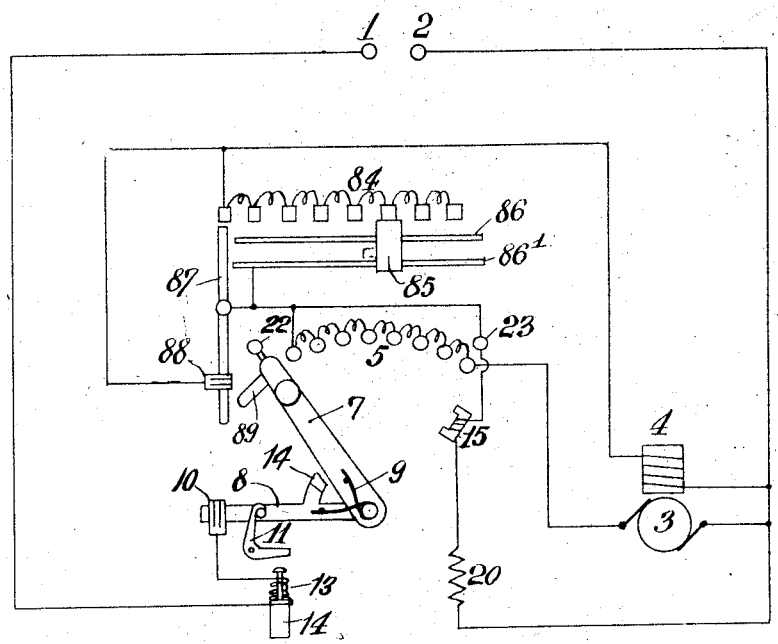

In Fig. 13 I show a form of starting rheostat and overload device previously described. The field resistance is indicated at 84 and the amount of this resistance in circuit with the field is varied by moving the element or rider 85 along the guides 86, 86'. The guide 86' is in electrical connection with the element 85 and with the initial contact of the starting resistance and contact 23. A pivoted lever 87 is in electrical connection with the same contacts as well as conductor 86' and in one position is adapted to engage a fixed contact 88, which contact is connected to a point between the field resistance and field coil. Arm 7 is provided with an abutment or projection 89 and when the arm 7 returns under pressure of spring 9 to off position it will engage the lever 87 and force it to engage contact 88. Hence upon starting, any field resistance in the circuit will be short circuited by the path through lever 87 and contact 88 to the field coil, giving the field its full strength. In order to remove the short circuit after starting, it will be necessary to move the element 85 to cut out all field resistance and to engage lever 87 so as to cause it to break connection with contact 88. The element 85 may then be moved to cut in the field resistance and vary the field strength as desired.

Many other modifications of my invention may be developed and various changes in the connections may be made and accomplish substantially the same results.

It will be understood that instead of using a starting rheostat contact switch, I may, in some cases, omit the starting resistance and use a plain switch. I may sometimes use a controlling armature resistance for varying the speed, in which case the arm of the rheostat would be freely movable and remain in any position placed.

It is not necessary in those cases where I provide a coil which is subjected to the drop in volts on the field rheostat, as in Figs. 4, 6, 7, 8, and 9, to connect one end of the coil to the controlling arm of the rheostat as shown, as the same result will be obtained by connecting to the final contact of the rheostat or to some intermediate contact. Also, although I have indicated resistances in the circuits of some of the coils which act automatically to cause a circuit to be opened, it will be understood that in some cases they may not be necessary and may be made adjustable if desired to change the volts dropped in them.

As my invention is susceptible of a variety of embodiments, all within the scope and spirit thereof, I do not wish or intend to limit the same to the specific constructions herein described, or otherwise than as expressed in the following claims.

Having thus described my invention, I declare that what I claim as new and desire to secure by Letters Patent, is,—

1. The combination of a motor having a field winding energized by a current independently of its armature current and permanently connected in a closed circuit containing the armature, armature controlling means, independent means for controlling the current in said field winding, and electrical means functionally relating the said two controlling means for insuring proper sequence of operation of said two means.

2. The combination of a rheostat for controlling the armature circuit of a motor, a rheostat for controlling the field of the motor, and electro-responsive means for protecting the motor against improper operation under a condition of weakened field, said means being affected under certain conditions by the armature controlling rheostat.

3. The combination of a rheostat for controlling the armature circuit of a motor, means for controlling the field strength, and electroresponsive means for insuring the starting up of the motor under a condition of proper field strength and for protecting the motor from overload current.

4. The combination of means for controlling the armature circuit of a motor, means for controlling the field strength of the motor, and means comprising an electro-responsive device for functionally relating the said two controlling means for insuring proper sequence of operation of said armature and field controlling means.

5. The combination of a starting resistance for an electric motor, said starting resistance having a movable element for varying the resistance, a resistance for controlling the field strength of the motor, said latter resistance having a movable element for varying the resistance, and independently movable electrical means for insuring that the field resistance will be in a proper condition as regards amount of effective resistance when the motor is started.

6. The combination of a shunt wound motor, a starting armature resistance, a variable field resistance, the shunt field winding the motor armature winding and said resistances being permanently connected in a local circuit, and electroresponsive means for preventing a weakened field condition when the motor is started.

7. The combination of a switch for starting a motor, means for varying the field strength of the motor, and electroresponsive means for preventing a weakened field condition when the motor is started, said electroresponsive means being connected in a local circuit with the motor armature independently of said switch.

8. The combination of an electric motor, a permanently closed local loop containing in series the motor armature and the resistance therefor, and the motor field winding and the resistance therefor, and electrically controlled means for automatically disconnecting said loop from the source of supply upon the occurrence of overload current through the motor armature and for insuring that the field resistance shall be in a proper condition as regards amount of effective resistance before starting the motor after the occurrence of such overload current.

9. The combination of a motor starting rheostat, a motor field rheostat and electro-responsive means for functionally relating the operation of said rheostats for insuring a field of proper strength when the motor is started.

10. The combination of means for controlling the energy supplied to one element of a motor, independently movable means for controlling the energy supplied to the other element of the motor, and electro-responsive means comprising a winding connected across the motor armature terminals for controlling the relative condition of the said controlling means.

11. An electric energy translating device having two elemental windings, independently movable means for varying the energy in the two windings, no-voltage protective means, and electro-responsive means for affecting the controlling means of one winding when the other controlling means is in a certain position.

12. The combination of a field rheostat having an adjustable element movable manually in both directions for varying the speed of a motor upon a constant electromotive force supply circuit, and electrically controlled means directly responsive to the variations in electromotive force at the motor armature terminals for preventing a condition of weakened field when the motor is started.

13. The combination with a motor, of a resistance for weakening the field strength of the motor for the purpose of increasing its speed, motor starting means, and novoltage responsive means for cutting out said resistance independently of the movement of the motor starting means.

14. The combination with a motor having a shunt field winding, of a rheostat for said field winding, a starting rheostat, means tending to move the contact arm of said starting rheostat toward the initial position, means for holding said arm and which is responsive to release said arm when the supply voltage falls below a certain amount, and electrically controlled means for cutting out the resistance of said field rheostat upon the occurrence of novoltage, said latter means being movable independently of the movement of said starting rheostat.

15. The combination of a motor starting switch, a motor field rheostat, and electrical means for insuring the proper field strength for the motor when it is started, said means being responsive to novoltage independently of the opening movement of said switch.

16. The combination of a motor starting switch, a motor field rheostat, and electrical means mechanically independent of said rheostat and directly responsive to the variations in electromotive force at the motor armature terminals for cutting out the field resistance while the motor is being started.

17. The combination with an electric motor, of an armature rheostat, means for varying the field strength, a novoltage protective device, an overload protective device, said devices being so related as to insure that the armature rheostat shall be in a protective position when the starting current is passed through the motor armature, and means comprising an electric contact device for insuring a proper field strength when the starting current is passed through the motor armature.

18. The combination of two windings, means for controlling the energy in one of said windings, means for controlling the energy in the other of said windings, and an electroresponsive device controlling one of said means and dependent upon the other of said controlling means and connected across the terminals of one of said windings, said means being functionally electrically protectively related but mechanically independent.

19. The combination of an electric motor, armature controlling means therefor, field controlling means therefor, a novoltage device and electro-responsive means protectively relating the said controlling means to insure that the field controlling means will be in proper condition as regards amount of effective resistance when the motor is started.

20. The combination of an electric motor, an armature controlling rheostat, a field controlling rheostat, a no-voltage device for controlling the armature rheostat, and a no-voltage device for controlling the field rheostat, the said armature rheostat controlling the said two no-voltage devices.

21. The combination of an electric motor, an armature controlling rheostat, a field controlling rheostat, a no-voltage device for controlling the armature rheostat, a no-voltage device for controlling the field rheostat, the said armature rheostat controlling the said two no-voltage devices, and an overload protective winding controlling the said no-voltage device which controls the field rheostat.

22. The combination of an electric motor, an armature controlling rheostat, a field controlling rheostat, a no-voltage device for controlling the armature rheostat, a no-voltage device for controlling the field rheostat, the said armature rheostat controlling the said two no-voltage devices, and overload electro-responsive means which acts independently and which controls the said no-voltage devices.

23. The combination of an electric motor, two protectively related automatically movable elements in series with each other and with the armature of said motor, one of said elements being automatically responsive to overload current and the other automatically responsive to no-voltage, and means for controlling the field of the motor, said means being controlled by at least one of said elements.

24. The combination of an electric motor, two automatically movable elements in series with each other and with the armature of said motor, one of said elements being automatically responsive to overload current and the other automatically responsive to no-voltage, and means for controlling the field of the motor, said means being controlled by each of said elements.

25. The combination of an electric motor, a movable element for controlling the armature circuit, a movable element for controlling the field circuit, a no-voltage device the current through which is controlled by said element controlling the armature circuit, and electro-responsive means for co-relating said two movable elements.

26. The combination of two independently movable manually operated resistance controlling elements, two electro-magnetic windings respectively controlled by said elements, and electrical means affected by the position of one of said elements for insuring that the resistance controlled by one element shall be in a certain condition when the other element is moved to reduce its resistance.

27. The combination of an electric motor having a field winding excited independently of its armature current, a motor starting rheostat in series with the armature winding of the motor, a resistance in series with said field winding, the movable element of said starting rheostat serving to control the circuit of the motor field winding, a no-voltage device for controlling the movable element of the said starting rheostat, and electrical means for insuring that the resistance in series with said field winding will be reduced to a proper amount when the motor is started.

28. The combination of an electric motor having a field winding excited independently of its armature current, a motor starting rheostat in series with the armature winding of the motor, a resistance in series with said field winding, the movable element of said starting rheostat serving to control the circuit of the motor field winding, a no-voltage device for controlling the movable element of the said starting rheostat, electrical means for insuring that the resistance in series with said field winding will be reduced to a proper amount when the motor is started, and an automatic overload circuit breaker which controls the entire current required for the motor armature and field winding and for the no-voltage device.

29. The combination of an electric motor having a field winding excited independently of its armature current, a motor starting rheostat in series with the armature winding of the motor, a resistance in series with said field winding, the movable element of said starting rheostat serving to control the circuit of the motor field winding, a no-voltage device for controlling the movable element of said starting rheostat, electrical means for insuring that the resistance in series with said field winding will be reduced to a proper amount when the motor is started, and an automatic overload circuit breaker which controls the entire current required for the motor armature and field winding and for the no-voltage device, said circuit breaker and motor starting rheostat being protectively related.

30. The combination of a motor armature rheostat having a movable arm, a spring for actuating said arm, a rheostat for controlling the field circuit of the motor, said field rheostat having a movable element, means whereby the latter element may be adjusted to and remain in any desired position, and electric means connected across the motor armature for insuring a proper field strength for the motor when it is started.

31. The combination of an electric motor, a permanently closed local loop containing in series the motor armature and resistance therefor and the motor field winding and resistance therefor, and electrically controlled means for automatically disconnecting said loop from the source of supply upon the occurrence of overload and for insuring that the field resistance shall be in a proper condition before starting the motor after the occurrence of said overload.

32. The combination of an electric motor, an armature controlling resistance having a movable element, a field resistance, and electro-responsive means energized independently of the current in the motor armature or field windings for controlling the field strength of the motor when the starting current is passed through the motor armature.

33. The combination with an electric motor, of an armature protective movable element, means for causing said element to move to a protective position upon the occurrence of overload, and automatic electrically controlled means for insuring a proper field strength for the motor when the starting current is passed through the motor armature.

34. The combination of an electric motor, having a field winding energized independently of its armature current, an armature rheostat, said rheostat having a movable element, a field rheostat, a no-voltage device controlling the movable element of said armature rheostat, and electrical means the circuit of which is controlled by said armature rheostat for automatically reducing the resistance in the field rheostat upon the occurrence of no-voltage.

35. The combination of an electric motor, a spring actuated resistance controlling switch in series with the armature, means for normally restraining said switch and which automatically releases said switch upon the occurrence of no-voltage, a resistance in series with the field winding of the motor, and electro-responsive means protectively corelated to said switch for automatically reducing the resistance in series with said field winding upon the occurrence of no-voltage.

36. The combination of an electric motor, a movable element controlling the armature circuit, means tending to move said element to an armature protective position, restraining means for said element which releases the same upon the occurrence of no-voltage, a field controlling resistance, electro-responsive means for automatically reducing said resistance upon the occurrence of no-voltage, the no-voltage responsive means being independent of the current through the motor armature or field winding and controlled by said controlling element.

37. The combination of an electric motor, an armature resistance, a field resistance, and means comprising two magnetic windings automatically responsive to no-voltage for inserting said armature resistance in series with the motor armature and for applying a short circuit to the said field resistance.

38. The combination of an electric motor, a field controlling resistance, and means automatically responsive to overload current through the armature for opening the armature circuit and for short circuiting resistance in series with the field winding of the motor.

39. The combination of an electric motor, a permanently closed local loop containing in series the motor armature and resistance therefor and the motor field winding and resistance therefor, and means for automatically disconnecting said loop from the source of supply and for short circuiting the field resistance upon the occurrence of no-voltage.

40. The combination of an electric motor, a permanently closed local loop containing in series the motor armature and resistance therefor and the motor field winding and resistance therefor, and electrically controlled means for automatically disconnecting said loop from the source of supply upon the occurrence of no-voltage and upon the occurrence of overload and for insuring that the field resistance shall be in proper condition before starting the motor after the occurrence of either no-voltage or overload.

41. The combination with an electric motor, of an armature protective movable element, means for causing said element to move to a protective position upon the occurrence of no-voltage and overload, and automatic electrically controlled means for insuring a proper field strength for the motor when the starting current is passed through the motor armature.

42. The combination with an electric motor, of an armature protective movable element, means for causing said element to move to a protective position upon the occurrence of overload, and automatic electrically controlled means controlled by said element for insuring a proper field strength for the motor when the starting current is passed through the motor armature.

43. The combination with an electric motor, of an armature protective movable element, means for causing said element to move to a protective position upon the occurrence of novoltage and overload, and automatic electrically controlled means controlled by said element for insuring a proper field strength for the motor when the starting current is passed through the motor armature.

44. The combination of an electric motor, two functionally related automatic switches, said switches being connected in series with each other and with the armature of said motor, a novoltage magnetic winding energized independently of the current through the motor armature or field winding for controlling at least one of said switches, a field varying resistance, a contact device for controlling the amount of said resistance in the field circuit, and means comprising an electro-responsive winding for automatically controlling said contact device, said means being controlled by at least one of said switches.

45. The combination of an electric motor having a shunt field winding, a controlling automatic switch whose automatic movement is responsive to change of electromotive force at the terminals of the motor armature, means for varying the field strength of the motor for varying the speed of the motor, and electrical means controlled by said switch for insuring proper field strength of the motor when the starting current is passed through the motor armature.

46. The combination of two rheostats connected in circuits in parallel with each other, two automatic switches controlling both of said circuits, and electro-responsive means depending upon the control of one of said rheostats for controlling the resistance in the other rheostat.

47. The combination of an electric motor, a permanently closed local loop containing in series the motor armature and resistance therefor and the motor field winding and resistance therefor, and electro-responsive means for automatically disconnecting said loop from the source of supply upon the occurrence of novoltage and for insuring that the field resistance shall be in proper condition before starting the motor after the occurrence of novoltage, said electro-responsive means comprising a winding energized independently of the working current in the motor armature or field winding.

48. The combination of an electric motor, a starting resistance, the said starting resistance having a spring actuated movable element, a magnet for retaining said element in normal running position, said magnet being energized independently of the working current of the motor armature and field winding and responsive to novoltage, an overload magnetic circuit breaker having its switch pivotally connected with said element, means for insuring that the said element will be in a protective position when the circuit breaker is closed, a field rheostat for varying the speed of the motor, and means comprising electrical contact connections for insuring a proper field strength for the motor when the starting current is passed through the motor armature.

49. The combination of a motor starting rheostat having a movable element for gradually cutting out the resistance in series with the armature of the motor, means controlled by said element in its resistance all out position for connecting the field winding of the motor in circuit without including the starting resistance, and a novoltage protective device controlling said element and normally energized independently of the current in the motor armature or field windings.

50. The combination of an electric motor having an armature winding and a field winding, and controlling means comprising two resistances for controlling the energy in said windings respectively, and comprising electroresponsive means for rendering ineffective the control of one of said resistances when the circuit affected by the other resistance is in a certain condition, the said field winding being protectively shunted under all conditions of control by a circuit for receiving inductive discharge.

51. The combination of an electric motor having an armature winding and a field winding, controlling means comprising two resistances for controlling the energy in said two windings respectively, and electroresponsive means for rendering the control of said resistances effective and ineffective, the said field winding being protectively shunted under all conditions of control by a circuit for receiving inductive discharge.

52. A dynamo electric machine having a winding, said winding being protectively shunted under all conditions of control by a circuit for receiving inductive discharge, manual means for controlling the energy in said winding, and electroresponsive means for rendering said controlling means effective and ineffective.

53. A dynamo electric machine having a field winding, said winding being protectively shunted under all conditions of control by a circuit for receiving inductive discharge, means for controlling the energy in said field winding, and electroresponsive means for rendering said controlling means effective and ineffective.

54. An electric motor having a field winding, said winding being protectively shunted under all conditions of control by a circuit for receiving inductive discharge, means for controlling the energy in said field winding, and means for rendering the said controlling means effective and ineffective, said means comprising an electroresponsive device for rendering the control of said field winding effective.

55. A motor having a field winding, said winding being protectively shunted under all conditions of control by a circuit for receiving inductive discharge, means for controlling the current in said field winding, and means dependent upon the electrical conditions in the armature circuit of the motor for affecting the said field winding controlling means.

56. An electric motor having a field winding, said winding being protectively shunted under all conditions of control by a circuit for receiving inductive discharge, a controlling rheostat for the motor, an electrical contact device for controlling the operative effect of the resistance of said rheostat, and electroresponsive means dependent upon the electrical conditions in the motor armature circuit for automatically controlling said contact device and thereby controlling the operative effect of said resistance.

57. An electric motor having a field winding, said winding being protectively shunted under all conditions of control by a circuit for receiving inductive discharge, a controlling field resistance, electric contact means for establishing a shunt circuit in parallel with said resistance, and electroresponsive means for controlling said contact means.

58. An electric motor having a field winding energized independently of its armature current, said winding being protectively shunted under all conditions of control by a circuit for receiving inductive discharge, means for varying the energy in said field winding, and automatic electroresponsive means for controlling the operative effect of said varying means.

59. An electric motor having a field winding, said winding being protectively shunted under all conditions of control by a circuit for receiving inductive discharge, means for varying the strength of the magnetic field of the motor, and electroresponsive means for establishing an auxiliary circuit and thereby controlling the operative effect of said first named means.

60. A dynamo electric machine having a field winding, said winding being protectively shunted under all conditions of control by a circuit for receiving inductive discharge, manual means for controlling the field strength of said machine, a device for rendering said means ineffective, and electroresponsive means for rendering said first named means effective under certain circuit conditions.

61. An electric motor having a field winding, said winding being protectively shunted under all conditions of control by a circuit for receiving inductive discharge, and controlling means, said means comprising means for controlling the field strength, a device for rendering said field controlling means ineffective, and electroresponsive means for rendering said field controlling means effective under certain electrical conditions.

62. An electric motor, and controlling means therefor, said means comprising a pair of resistances, each of said resistances having contacts for varying its effective resistance, and magnetically controlled electric contact means responsive to the counter-electromotive force of the motor armature independently of the line electromotive force for rendering effective the control of one of said resistances.

63. A motor starting and speed regulating apparatus comprising an armature resistance, a field resistance, and an electromagnetic device for controlling the operative connection of said field resistance, said device being directly controlled by the counter-electromotive force of the motor armature independently of the line electromotive force.

64. A motor starting and speed regulating apparatus comprising an armature resistance, a field resistance, and electromagnetically controlled means for controlling the effective amount of resistance in the field circuit, said latter means comprising a magnetic winding responsive to the counter-electromotive force of the motor armature independently of the line electromotive force.

65. Motor controlling mechanism comprising protective means, said means comprising two electric windings each responsive to no-voltage for controlling the motor, and also comprising two switches in series with each other, each of said switches controlling the motor armature circuit and the circuit of said two windings.

66. A constant electromotive force supply circuit, an electric motor having an armature winding and a field winding, and protective means comprising resistance, a no-voltage winding, an electroresponsive resistance controlling winding, the circuit of each of said windings being in parallel with each other with reference to the supply circuit, and a common automatic means for controlling the current in all of said windings.

67. A supply circuit and electric motor, an armature resistance, a field resistance, an electroresponsive winding controlling the effective operation of said field resistance, a branch circuit containing the motor armature and armature resistance, a second branch circuit containing a field winding and a field resistance, a third branch circuit containing said electroresponsive winding, and an automatically movable circuit controlling element controlling the said three branch circuits.

68. An electric motor, an automatic overload circuit breaker, and automatic means comprising a winding for controlling the field strength of the motor, said circuit breaker controlling the circuit of the motor armature and field winding and also the circuit of said controlling winding.

69. An electric motor having a field winding energized independently of its armature current, an automatic no-voltage circuit breaker, and automatic means comprising a winding for controlling the field strength of the motor, said circuit breaker controlling the circuit of the motor armature and said field winding and also the circuit of said controlling winding.

70. An electric motor, two mechanically related independently movable automatic circuit-breakers in series with each other, and automatic means comprising a winding for controlling the circuit of a field winding of the motor, said two circuit-breakers controlling the circuit of the motor armature and the circuit of said first named winding.

71. An electric motor, and controlling means therefor, said means comprising a magnetic winding connected across the motor armature, and a movable circuit controlling element controlled by said winding for controlling the circuit of a field winding of the motor.

72. An electric motor, a controlling resistance therefor, means responsive to an increase in volts upon the motor armature for rendering said resistance effective and responsive to a decrease in said volts for rendering said resistance ineffective, and an automatic circuit breaker the switch of which controls the entire motor current and the current to said means.

73. An electric motor, controlling means therefor, electroresponsive means comprising an auxiliary circuit device for rendering said controlling means effective and ineffective, said electroresponsive means being responsive to electrical conditions in the motor armature circuit and establishing said auxiliary circuit for rendering said controlling means ineffective, and circuit controlling means responsive to no-voltage and to overload and controlling the circuit to said motor and the circuit of said electroresponsive means.

74. An electric motor, a field controlling resistance, and automatic short-circuiting means for rendering said resistance effective and ineffective, said means comprising a winding responsive to an electrical condition of the motor armature independently of the line electromotive force.

75. An electric motor, a field controlling resistance therefor, and a magnetic winding connected directly in shunt about the motor armature and responsive to the armature electromotive force independently of the line electromotive force for automatically controlling said field resistance.

76. An electric motor having a field winding energized independently of its armature current, controlling means for increasing the voltage upon the motor armature and for decreasing the voltage upon the motor field winding, said means comprising an electroresponsive winding responsive to the counter-electromotive force of the motor for protectively controlling the circuit containing the field winding.

77. An electric motor, a supply circuit, controlling means comprising a no-voltage winding and a responsive winding for magnetically moving a circuit controlling element, four branch circuits connected together containing respectively a motor armature winding, a motor field winding, said no-voltage winding and said responsive winding, and means for automatically disconnecting said four circuits from said supply circuit.

78. An electric motor, a constant electromotive force supply circuit, said motor having a field winding permanently connected with the motor armature in a local circuit, and means for protectively affecting the circuit of said field winding upon no-voltage and also until the counter volts of the motor have reached a certain amount while the motor armature is being accelerated.

79. A constant electromotive force supply circuit. an electric motor having a field winding, and means for electrically controlling the circuit of said winding until the volts upon the motor armature reach a certain amount and for protecting the circuit of the motor armature upon no-voltage and upon overload.

80. An electric motor, a field rheostat, electric contact means for short circuiting said rheostat when the starting current is passed through the motor, automatic means for removing said short circuit during the acceleration of the motor, and a magnetic overload circuit-breaker, the switch of said circuit-breaker carrying the motor starting current and the opening of said switch causing the automatic short circuiting of said rheostat.

81. An electric motor, an armature resistance, a field resistance, means for rendering said field resistance effective and ineffective, said means comprising an electric contact device adapted to shunt the field resistance, and a movable element for controlling the circuit of said armature resistance, said element being automatically movable in response to overload current through the motor armature.

82. An electric motor having a shunt field winding and an armature winding permanently connected in a local circuit, field controlling mechanism therefor, armature controlling mechanism therefor, and electric means whereby said latter mechanism automatically controls said former mechanism to render said former mechanism effective under certain electrical conditions.

83. An electric motor, an armature controlling resistance, a field controlling resistance, movable means for controlling said resistances, and independently movable electric means functionally relating said resistances for insuring a field of proper strength when the motor is started.

84. An electric motor, an armature controlling movable element, an electric winding responsive to no-voltage functionally related therewith, a field controlling movable element, and an electric winding responsive to no-voltage functionally related to said field controlling element, each of said windings being energized by current other than the current in the motor armature or field winding.

85. An electric motor having an armature winding and a field winding, a field resistance for controlling the current in said field winding, and an electroresponsive winding for automatically controlling said field resistance, said armature winding and said electroresponsive winding being connected in series in a permanently closed local circuit.

86. An electric motor having an armature winding and a field winding, an armature resistance, a field controlling resistance, and an electroresponsive winding for automatically controlling said field resistance, said armature resistance, said field winding, said field controlling resistance, and said electroresponsive winding being permanently connected in series in a closed local circuit.

87. In a controller for electric motors, the combination of an armature resistance, a field regulating resistance, a controlling member therefor, a pair of contacts connected in a shunt circuit around said field resistance, and an electromagnetic winding connected across the motor armature, a plunger mounted within said winding, and a switch carried by said plunger, said switch being adapted when in one position to bridge said pair of contacts.

88. An electric motor, an armature resistance, a no-voltage controlling winding, and an electroresponsive winding for controlling the motor, said resistance, said no-voltage winding and said electroresponsive winding being permanently connected in series with each other in a closed local circuit.

In testimony whereof I affix my signature, in presence of two witnesses.

H. WARD LEONARD.

Witnesses:
L. R. SAGER,
HENRY BEST.